[12] United States Patent
Mese et al.

(10) Patent No.: US 8,355,873 B2
(45) Date of Patent: Jan. 15, 2013

(54) METHOD OF RESERVOIR CHARACTERIZATION AND DELINEATION BASED ON OBSERVATIONS OF DISPLACEMENTS AT THE EARTH'S SURFACE

(75) Inventors: Ali Mese, Houston, TX (US); Syed Hamid, Dallas, TX (US); Dingding Chen, Plano, TX (US); Harry D. Smith, Jr., Montgomery, TX (US); John Howard, Katy, TX (US); Neal Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1153 days.

(21) Appl. No.: 11/288,826

(22) Filed: Nov. 29, 2005

(65) Prior Publication Data

US 2007/0124079 A1    May 31, 2007

(51) Int. Cl.
*G01V 9/00*    (2006.01)
(52) U.S. Cl. .............. 702/13; 702/5; 702/6; 702/12
(58) Field of Classification Search .............. 702/5, 6, 702/12, 13
See application file for complete search history.

(56) References Cited

U.S. PATENT DOCUMENTS

| 4,121,464 | A | | 10/1978 | Geiger |
|---|---|---|---|---|
| 4,244,223 | A | | 1/1981 | Geiger |
| 4,271,696 | A | | 6/1981 | Wood |
| 4,353,244 | A | | 10/1982 | Wood |
| 4,957,001 | A | * | 9/1990 | Powell ............................ 73/716 |
| 5,040,414 | A | | 8/1991 | Graebner |
| 5,159,833 | A | | 11/1992 | Graebner |
| 5,417,103 | A | | 5/1995 | Hunter et al. |
| 5,934,373 | A | | 8/1999 | Warpinski et al. |
| 6,002,063 | A | | 12/1999 | Bilak et al. |
| 6,434,435 | B1 | * | 8/2002 | Tubel et al. ..................... 700/30 |
| 6,497,279 | B1 | | 12/2002 | Williams et al. |
| 6,766,255 | B2 | | 7/2004 | Stone |

(Continued)

FOREIGN PATENT DOCUMENTS

GB    02382136    10/2001

(Continued)

OTHER PUBLICATIONS

SPE 46194, "Downhole Tiltmeter Fracture Mapping: Finally Measuring Hydraulic Fracture", C.A. Wright, et al., dated 1998.

(Continued)

*Primary Examiner* — Michael Nghiem
*Assistant Examiner* — Elias Desta
(74) *Attorney, Agent, or Firm* — Smith IP Services, P.C.

(57) ABSTRACT

Reservoir characterization based on observations of displacements at the earth's surface. One method of characterizing a reservoir includes the steps of: detecting a response of the reservoir to a stimulus, the stimulus causing a pressure change in the reservoir; and determining a characteristic of the reservoir from the response to the stimulus. The response may be the pressure change which varies periodically over time, or a set of displacements of a surface of the earth. In another example, a method includes the steps of: detecting a set of displacements of the earth's surface corresponding to a pressure change in the reservoir; and determining a characteristic of the reservoir from the surface displacements. In yet another example, a method includes the steps of: detecting a set of displacements of the earth's surface corresponding to a change in volume of the reservoir; and determining a characteristic of the reservoir from the surface displacements.

15 Claims, 4 Drawing Sheets

U.S. PATENT DOCUMENTS

| | | | |
|---|---|---|---|
| 6,813,564 B2* | 11/2004 | Eiken et al. ................. 702/5 |
| 6,901,391 B2 | 5/2005 | Storm, Jr. | |
| 7,069,990 B1* | 7/2006 | Bilak ................. 166/271 |
| 7,096,942 B1* | 8/2006 | de Rouffignac et al. ...... 166/245 |
| 2005/0087335 A1 | 4/2005 | Vick, Jr. | |
| 2006/0043972 A1 | 3/2006 | Williamson, Jr. | |

FOREIGN PATENT DOCUMENTS

| | | |
|---|---|---|
| WO | WO 99/45235 | 9/1999 |
| WO | WO 01/04581 | 1/2001 |

OTHER PUBLICATIONS

SPE 62577, "Precise Tiltmeter Subsidence Monitoring Enhances Reservoir Management", E. Davis, et al., dated 2000.
SPE 39919, "Surface Tiltmeter Fracture Mapping Reaches New Depths—10,000 Feet, and Beyond?", C.A. Wright, et al., dated 1998.
SPE 71648, "Real-time Fracture Mapping from the "Live" Treatment Well", C.A. Wright, et al., dated 2001.
SPE 97848, "Mapping Reservoir Volume Changes During Cyclic Steam Stimulation Using Tiltmeter-Based Surface Deformation Measurements", dated 2005.
SPE 7484, "Response of a Closed Well-Reservoir System to Stress Induced by Earth Tides", dated 1978.
SPE 96897, "Mapping Fluid Flow in a Reservoir Using Tiltmeter-Based Surface-Deformation Measurements", dated 2005.
SPE 59295, "Waterflood Surveillance and Supervisory Control", dated 2000.
SPE 71610, "Use of Satellite Radar Images in Surveillance and Control of Two Giant Oilfields in California", dated 2001.
SPE 95566, "Mapping Preferential Flow in a West Texas Waterflood Using Surface Tiltmeters", dated 2005.
Melchior, Paul, "The Earth Tides", 1966.
Sun, Ren Jen, "Theoretical Size of Hydraulically Induced Horizontal Fractures and Corresponding Surface Uplift in an Idealized Medium", dated 1969.
Wood, Inc., "The Geometry of a Large-Scale Nitrogen Gas Hydraulic Fracture Formed in Devonian Shale: An Example of Fracture Mapping with Tiltmeters", dated Oct. 1982.
Davis, Paul M., "Surface Deformation Due to Inflation of an Arbitrarily Oriented Triaxial Ellipsoidal Cavity in an Elastic Half-Space, with Reference to Kilauea Volcano, Hawaii", dated 1986.
Dieterich, James H., "Finite Element Modeling of Surface Deformation Associated with Volcanism", dated 1975.
Fialko, Yuri A. & Rubin, Allan M., "What Controls the Along-Strike Slopes of Volcanic Rift Zones", Sep. 1999.
Fialko, Yuri & Simons, Mark, "Deformation and Seismicity in the Coso Geothermal Area, Inyo County California: Observations and Modeling Using Satellite Radar Interferometry", dated 2000.
Mogi, Kiyoo, "Relations Between the Eruptions of Various Volcanoes and the Deformations of the Ground Surfaces Around Them", dated 1958.
Fialko, Yuri, "Finite Source Modelling of Magmatic Unrest in Socorro, New Mexico, and Long Valley, California", dated 2001.
World Oil, "Can Tidal-driven Pressure Changes Reveal Reservoir Properties for Use in 4D Monitoring?" dated Mar. 2005.
The American Association of Petroleum Geologists,"The Use of Satellite-based Radar Interferometry to Monitor Production Activity at the Cold Lake Heavy Oil Field, Alberta Canada", dated 2001.
Geophysics, "Poroelasticity: Efficient Modeling of Strongly Coupled, Slow Deformation Processes in a Multilayered Half-Space", dated Mar.-Apr. 2003.
GEOL 702h—Geophysics—Remote Sensing for Geoscience Applications Imaging Radar; Course Syllabus; Spring 2002, Dr. James V. Taranick.
Patricia C. Arditty, "The Earth Tide Effects on Petroleum Reservoirs" Stanford University Thesis, May 1978.
U.S. Department of Commerce, National Technical Information Service, "Engineering Development of Hydraulic Fracturing as a Method for Permanent Disposal of Radioactive Wastes,"paper No. ORNL47259, www.ntis.gov, pp. 1-270 (Aug. 1968).
SPE 23142, "Monitoring Compaction and Compressibility Changes in Offshore Chalk Reservoirs," Graham Dean, et. al., pp. 73-76 (Mar. 1994).
SPE 56437, "Tidal-Force-Influenced Pressure Transients for Estimating Compressibility in a Fractured Reservoir," Eric Chang, et. al., pp. 1-15 (Oct. 1999).
SPE 20532, "Vertical Permeability Measurement in New Reservoirs Using Tidal Pressure Changes," M.J. Wannell, et. al., pp. 35-46 (Sep. 1990).
SPE 11070, "Fracture Orientation Analysis by the Solid Earth Tidal Strain Method," Jonathan M. Hanson, et. al., 18 pages (Sep. 1982).
SPE 16985, "Use of Well Test Results in Oilfield Development Planning in the Timor Sea," K.A. Edwards, et. al., pp. 1372-1382 (Oct. 1988).
SPE 38939, "Coupling Reservoir and Geomechanics to Interpret Tidal Effects in a Well Test," J.F. Pinilla, et. al., pp. 301-314 (Oct. 1997).
SPE 14607, "Tidal Effect in Petroleum Well Testing," Milan Hemala, et al., pp. 139-151 (Jan. 1986).
Myer, et al., "Use of Visualization Technique in Analysis of Well Failures in Diatomite Reservoirs," The Leading Edge, vol. 15, No. 3, pp. 185-189, (1996).
Vasco et al., "Monitoring of Fluid Injection and Soil Concentration Using Surface Tilt Measurements," Journal of Geotechnical and Geoenvironmental Engineering 124, pp. 29-37 (1998).
Vasco et al., "Using Surface Deformation to Image Reservoir Dynamics," Geophysics, 65, pp. 132-147 (2000).
Chang E. and Firoozabadi, A. Gravitational Potential Variations of the Sun and Moon for Estimation of Reservoir Compressibility, SPE Journal, vol. 5, No. 4, pp. 456-465 (Dec. 2000).
Robinson, et al., "Tides in Confined Well—Aquifer Systems," Journal of Geophyscial Research, pp. 1857-1869, (Mar. 10, 1971).
Bodvarrson, G., "Confined Fluids as Strain Meters," Journal of Geophysical Research, vol. 75, No. 14, pp. 2177-2718 (May 10, 1970).
Aese, et al., "Tide Effects Removed from Well Tests," Oil and Gas Journal, pp. 78-82 (May 1, 1995).
Hanson, J.M., "Reservoir Response to Tidal and Barometric Effects," Geothermal Resource Council, Transactions, vol. 4, pp. 337-340 (Sep. 1980).
Khurana, A.K., "Influence of Tidal Phenomena on Interpretation of Pressure Build-up and Pulse Tests," APEA Journal, pp. 99-105 (1976).
Cooper, H.H. et al., "The Response of Well—Aquifer Systems to Seismic Waves," Journal of Geophysical Research, vol. 70, No. 16, pp. 3915-3926 (Aug. 15, 1965).
Bredehoeft, J.D., "Response of Well—Aquifer Systems to Earth Tides," Journal of Geophysical Research, vol. 72, No. 12, pp. 3075-3087 (Jun. 15, 1967).
Morland, L.W. et al, "Correlation of Porosity and Permeability of Reservoirs with Well Oscillations Induced by Earth Tides," Geophysical Journal, pp. 705-725 (1984).
Narasimhan, T.N. et al., "Interpretation of Earth Tide Response of Three Deep, Confined Aquifers," Journal of Geophysical Research, vol. 89, No. B3, pp. 1913-1924 (Mar. 10, 1984).
Hsieh, P.A. et, al., "Response of Well Aquifer Systems to Earth Tides: Problem Revisited," Water Resources Research, vol. 24, No. 3, pp. 468-472, (Mar. 1988).
Ramey, H.J., "Pressure Transient Testing," Journal of Petroleum Technology, pp. 1407-1413 (Jul. 1982).
International Search Report for International Patent Application No. PCT/US06/60015, dated Jul. 26, 2008, (2 pages.).
Written Opinion for International Patent Application No. PCT/US06/60015, dated Jul. 26, 2008, (3 pages.).
Don Vasco, et al., "Using Surface Deformation to Image Reservoir Dynamics," Geophysics, vol. 65, No. 1, dated Jan./Feb. 2001, pp. 132-147.

* cited by examiner

METHOD OF RESERVOIR CHARACTERIZATION AND DELINEATION BASED ON OBSERVATIONS OF DISPLACEMENTS AT THE EARTH'S SURFACE

BACKGROUND

The present invention relates generally to operations performed and systems utilized in conjunction with subterranean wells and, in an embodiment described herein, more particularly provides a method of reservoir characterization based on detection of displacements at the earth's surface.

Many benefits may be realized by having the capability of accurately determining characteristics (such as volume, permeability, shape, location, presence, etc.) of a reservoir. For example, optimal locations for drilling infill wells in a field, optimal production and/or injection rates and other useful information may be determined once the reservoir characteristics are reasonably well known.

Further benefits may be realized if the reservoir characteristics can be evaluated without flowing reservoir fluid to the surface as is done in typical drill stem tests. For example, environmental hazards, safety hazards, the cost of transporting drill stem testing equipment and crews to drilling sites, etc. may be reduced or eliminated if reservoir fluid is not flowed to the surface.

Still further benefits may be realized if reservoir characteristics can be known, or at least predicted with acceptable accuracy, without drilling into the reservoir. For example, the substantial cost of drilling could be avoided if the predicted reservoir characteristics do not justify the drilling cost; or the drilling location could be optimized to produce a maximum return on investment.

SUMMARY

In carrying out the principles of the present invention, methods and systems for reservoir characterization are proposed which provide one or more of the above described benefits. In one benefit described below, for example, displacements detected at a surface of the earth are used to determine characteristics of a reservoir.

One aspect of the invention provides a method of characterizing a subterranean reservoir. The method includes the steps of: introducing a stimulus (e.g., a pressure and/or temperature change, etc.) in a reservoir; detecting a response of the reservoir to the stimulus; and determining a characteristic from within the reservoir from the response to the stimulus. The response may be a transient or a periodic variation in pressure over time.

The stimulus may be applied to the reservoir by human intervention, for example, by applying the pressure change to the reservoir via a wellbore intersecting the reservoir. The stimulus may instead, or in addition, be applied to the reservoir by periodic tidal loading. The tidal loading may be gravitational force exerted on the earth by a heavenly body. The tidal loading may also be hydrostatic pressure applied to the surface of the earth due to ocean tides.

The reservoir characteristic determined in the method may be the volume, shape, location, permeability, porosity, or compressibility of the reservoir, fluid mobility and compressibility in the reservoir or a location of fluid transfer in the reservoir. Any combination of these and/or other reservoir characteristics may be determined in the method, as well. In addition, the manner in which the reservoir characteristics change over time may also be determined.

In another aspect of the invention, a method of characterizing a reservoir may include the steps of: detecting a set of displacements of a surface of the earth corresponding to a positive or negative pressure change in the reservoir over a certain time; and determining a characteristic of the reservoir from the surface displacements. In this method, the reservoir characteristic may be at least one of volume, shape, location, gross permeability, average porosity, a location of fluid transfer, fluid mobility, compressibility, and a thermal characteristic. The reservoir characteristic may also be a change in a reservoir parameter over time.

In yet another aspect of the invention, a method of characterizing a reservoir may include the steps of: detecting a set of displacements of a surface of the earth corresponding to a change in volume of the reservoir for whatever reason; and determining a characteristic of the reservoir from the surface displacements.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
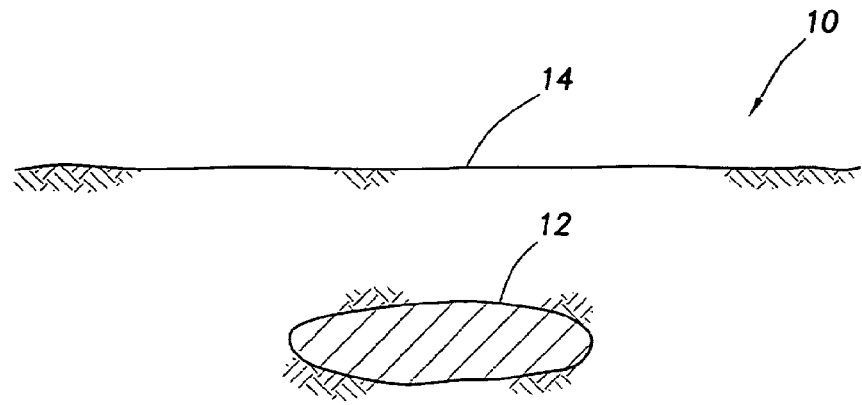
FIG. 1 is a schematic cross-sectional view pertinent to characterizing a reservoir and explaining the method embodying principles of the invention. The reservoir in FIG. 1 has a reference, initial volume.

Representatively illustrated in FIG. 1 is a method 10 of characterizing a reservoir which embodies principles of the present invention. In the following description of the method 10 and other apparatus and systems described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

The method 10 is used to characterize one or more subterranean reservoirs, such as the reservoir 12 depicted in FIG. 1. Various characteristics of the reservoir 12, including but not limited to volume, geometric shape, location, presence, gross permeability, average porosity, a location of fluid transfer; fluid mobility, and compressibility may be determined in the method 10. Compressibility of fluid and solid components of the reservoir 12 may be determined in the method 10.

In one unique feature of the method 10, displacements (including but not limited to vertical and/or horizontal displacements, angular deflections, etc.) at a surface 14 of the earth are detected and used in the method 10 to determine the characteristics of the reservoir 12. Other information, such as that obtained via downhole measurements, core samples, field history, downhole pressure sensors, sensors which detect displacements in a wellbore, etc. may also be used in various alternative embodiments of the method 10 as supplementary, supportive information.

Note that, as used in this patent specification, the earth's surface 14 may be above or below water. For example, an ocean floor is considered to be the earth's surface 14, even though it is covered with water.

As depicted in FIG. 1, the reservoir 12 has an initial or reference shape and volume. The earth's surface 14 above the reservoir 12 has a corresponding initial or reference contour. In the case where there is ongoing fluid transfer (such as production from, or injection into, the reservoir 12), the initial shape and volume of the reservoir and the initial contour of the earth's surface 14 may not be steady state.

Figure 2:
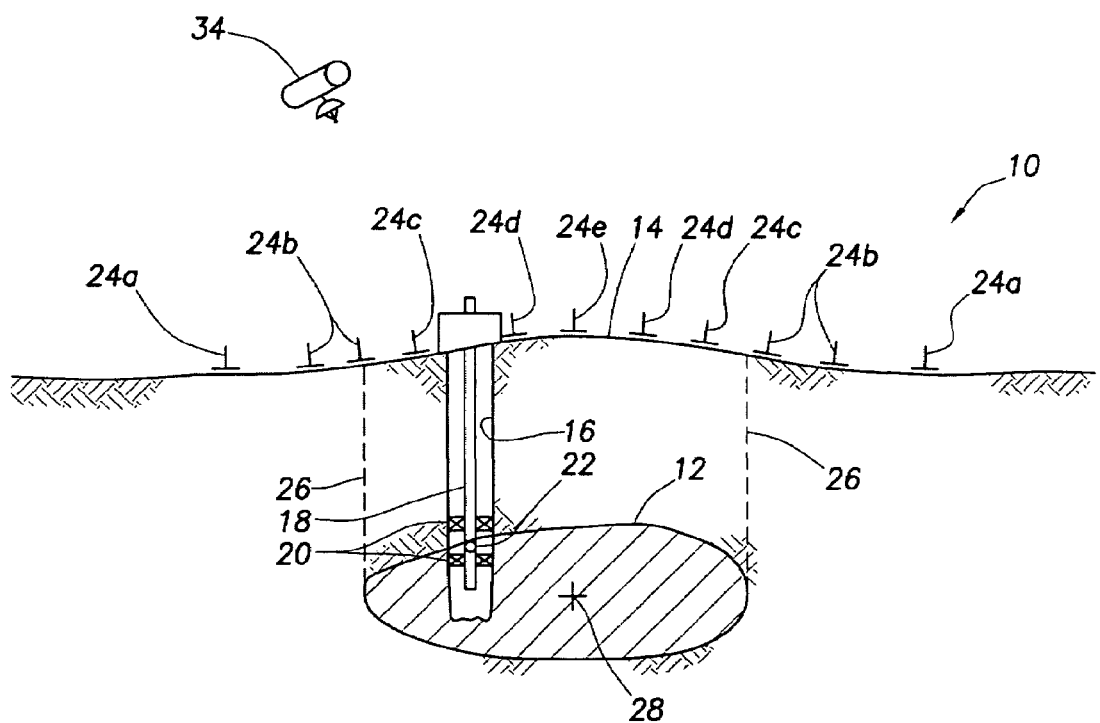
FIG. 2 is a schematic cross-sectional view of the reservoir, wherein the reservoir has an altered volume due to a pressure change in the reservoir.

In FIG. 2, however, the reservoir 12 has an expanded volume. The earth's surface 14 has a resulting deformed contour, i.e., in this illustration, it has bulged upward somewhat where it overlies the reservoir 12. In the case where fluid is transferred out of the reservoir 12, the reservoir volume could contract instead of expand. Note that the reservoir 12 is not necessarily a completely fluid filled space.

The change in volume of the reservoir 12 depicted in FIG. 2 may be due to human intervention, such as by applying a pressure change to the reservoir via a wellbore 16 drilled into the reservoir. As depicted in FIG. 2, a tubular string 18 has been conveyed into the wellbore 16. Packers 20 in the tubular string 18 have been set straddling a portion of the wellbore 16 intersecting the reservoir 12. The wellbore 16 is illustrated as being uncased, but it could be cased if desired. Reduced or elevated pressure applied to the tubular string 18 is communicated to the reservoir 12 via a port 22 in the tubular string between the packers 20.

It may now be appreciated that certain characteristics of the reservoir 12 can be determined by detecting displacements of the earth's surface 14 in response to the change in volume of the reservoir. For example, the location and peripheral shape of the reservoir 12 may be determined by observing which portions of the earth's surface 14 have been displaced in response to the change in volume of the reservoir.

In FIG. 2, displacements of the earth's surface 14 are detected using an array of tiltmeters 24a-e. These tiltmeters 24a-e are of the type capable of detecting very small (e.g., nanoradian) angular displacements. Although the tiltmeters 24a-e are depicted in FIG. 2 as being positioned on the earth's surface 14, preferably the tiltmeters are installed in holes formed into the earth's surface.

Note that it is not necessary for the tiltmeters 24a-e to be spaced out covering an entire reservoir. For example, in the case of an exploratory well where the extent of the reservoir may not be known, the tiltmeters 24a-e may only partially cover the reservoir. After initial measurements are obtained, the tiltmeters 24a-e could be repositioned as needed to obtain more accurate results.

It will be appreciated that displacements detected by the tiltmeters 24a-e can include horizontal and/or vertical displacement components. Therefore, it should be understood that the principles of the invention are not limited to use of angular displacements to the exclusion of horizontal and/or vertical displacements. Any type or combination of displacements may be used in keeping with the principles of the invention.

The tiltmeters 24a-e do not instantaneously detect a response of the earth's surface 14 due to the change in volume of the reservoir 12, since the earth's surface does not immediately displace when a stimulus is applied to the reservoir. Instead, the effect of the stimulus propagates over time through the reservoir 12, and the earth's surface 14 responds over time to the changed volume or other characteristic of the reservoir.

Thus, there is a time dependent relationship between the application of the stimulus to the reservoir 12 and the displacements detected by the tiltmeters 24a-e. This time dependence (for example, how quickly the tiltmeters 24a-e detect a response of the earth's surface 14 to the stimulus applied to the reservoir 12, and how rapidly the deflection of the earth's surface changes over time, etc.) is a source of valuable information regarding characteristics of the reservoir, such as porosity, permeability, volume, etc.

Note that, sufficiently beyond the periphery 26 of the reservoir 12, some of the tiltmeters 24a may detect no angular displacement of the earth's surface 14 due to the expansion of the reservoir 12, because the displacement is too small to be detected. This observation gives an indication of the outer boundary of the reservoir 12. As the periphery 26 of the reservoir 12 is more closely approached, some of the tiltmeters 24b may indicate a gradual increase in angular deflection.

Maximum angular deflection may be detected by tiltmeters 24c which are located between the periphery 26 of the reservoir 12 and a geometric center 28 of the reservoir. As the center 28 of the reservoir 12 is approached, tiltmeters 24d may indicate a gradual reduction in angular deflection. A tiltmeter 24e located directly over the center 28 of the reservoir 12 may indicate no angular deflection.

Thus, it may be seen that the center 28 of the reservoir 12 may be readily located, as well as can be the periphery 26 and thus the shape of the reservoir. Using techniques such as those discussed in further detail below, accurate determinations may be made for these and other characteristics of the reservoir 12.

As mentioned above, the time dependence of the displacements of the earth's surface 14 as detected by the tiltmeters 24a-e can provide very useful information regarding certain characteristics of the reservoir 12. For example, it is expected that those tiltmeters 24c,d closest to the wellbore 16 will detect angular deflection of the earth's surface 14 first. The angular deflection will eventually propagate out to the more remote tiltmeters 24a,b,e and the speed and extent of this propagation can provide very useful information regarding mobility of the fluid in the reservoir 12 (e.g., porosity, permeability, fluid viscosity, etc.).

Another manner in which displacements at the earth's surface may be detected is by using measurements recorded by one or more satellites 34. For example, satellite-based measurements such as those provided by DInSAR (differential interferometric synthetic aperture radar) and coordinated by the United States Geological Survey may be used to detect displacements of the earth's surface 14. Such measurements may be used in the method 10 as depicted in FIG. 2, or in the alternate embodiment depicted in FIG. 7 and described more fully below. Any other manner of detecting displacements at the earth's surface may be used in keeping with the principles of the invention.

Note that it is not necessary in the method 10 for pressure to be only increased in the reservoir 12. Pressure in the reservoir 12 could instead be decreased, for example, by withdrawing fluid from the reservoir via the tubular string 18. In that case, the angular displacements detected by the tiltmeters 24*b-d* may be in directions opposite to those described above and illustrated in FIG. 2. In practice, production of fluid from the reservoir 12 would likely be the most common manner of causing a change in volume of the reservoir. Other techniques for causing a change in volume of the reservoir 12 (for example, using multiple wells intersecting the reservoir) may be used in keeping with the principles of the invention.

Note, also, that a change in volume is only one type of response and a change in pressure is only one type of stimulus which may be used in the method 10. Any type of stimulus and any type of response to a stimulus which correspondingly produces a displacement at the earth's surface 14 may be used in the method 10.

Furthermore, characteristics of the reservoir 12 could be determined from other responses of the reservoir to other stimuli. Injection of fluid into the reservoir 12 which fluid is at a different temperature than the reservoir could provide a thermal stimulus to the reservoir. A response of the reservoir 12 to this thermal stimulus could provide information regarding characteristics of the reservoir, such as thermal characteristics of the formation.

For example, if a fluid which is at a higher temperature than the reservoir 12 is injected into the reservoir, then the reservoir may initially expand in volume, and then contract as the fluid temperature decreases. A generally opposite response could be expected if a fluid which is at a lower temperature than the reservoir 12 is injected into the reservoir.

From an analysis of the manner in which the response of the reservoir 12 to the thermal stimulus changes over time, various characteristics of the reservoir may be determined. These characteristics include, but are not limited to, coefficient of thermal expansion and thermal conductivity of fluid and/or solid components of the reservoir 12, as well as the other physical characteristics described herein.

Figure 3:
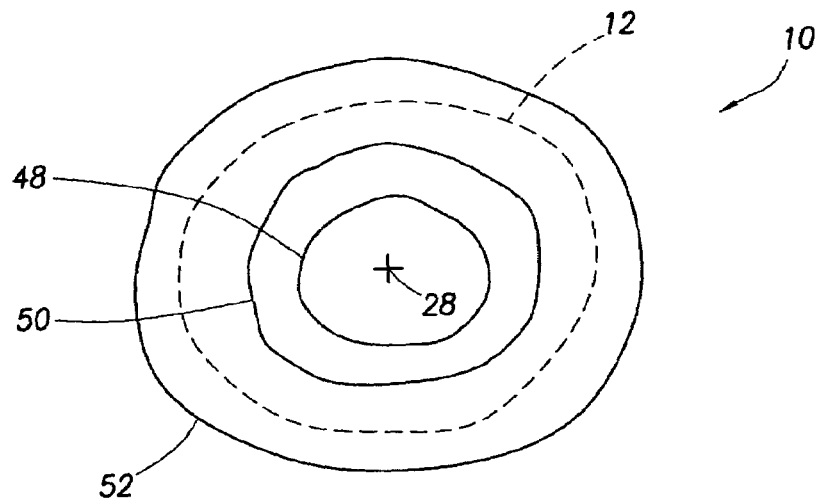
FIG. 3 is a schematic plan view of a vertical component of displacements that may be detected in the method.

Referring additionally now to FIG. 3, one manner in which characteristics of the reservoir 12 may be determined in the method 10 is representatively illustrated. The reservoir 12 is shown in dashed lines from a plan view in FIG. 3. Solid lines 48, 50, 52 in FIG. 3 indicate respective constant vertical components of the displacements of the earth's surface 14.

Using the embodiment of the method 10 depicted in FIG. 2 as an example, expansion of the reservoir 12 generally produces the greatest vertical displacement of the earth's surface 14 near the center 28 of the reservoir (as indicated by line 48), decreasing vertical displacement as the periphery of the reservoir is approached (as indicated by line 50), and minimal vertical displacement beyond the periphery of the reservoir (as indicated by line 52). These constant vertical displacement lines 48, 50, 52 may be provided directly by the DInSAR technology discussed above or by other satellite-based measurements, by techniques such as integration of the tiltmeter 32 measurements, or by any other techniques. Only three of the lines 48, 50, 52 are shown in FIG. 3 for illustrative clarity, but it will be appreciated that any number of lines may be used as desired.

Note that it is expected that the center 28 of the reservoir 12 will be located within the outline of the line 48 indicating greatest vertical displacement. It is also expected that the periphery of the reservoir 12 will be located within the outline of the line 52 indicating minimal vertical displacement. In this manner, characteristics of the reservoir 12 (such as shape, location, center, presence, etc.) may be determined directly from the measured vertical displacements. More accurate determinations and additional characteristics of the reservoir 12, based on the vertical displacements of the earth's surface 14 (either alone or combined with other data), may be obtained using the virtual intelligence techniques described more fully below.

Figure 4:
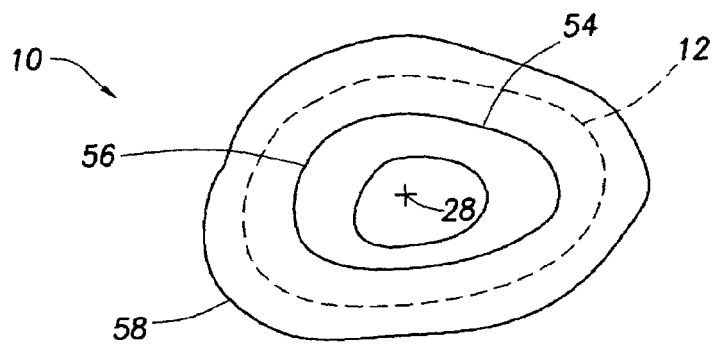
FIG. 4 is a schematic plan view of a horizontal component of displacements that may be detected in the method.

Note that it is not necessary for only vertical displacement components to be used in determining characteristics of the reservoir 12. In FIG. 4 an illustration similar to that of FIG. 3 is shown, except that lines 54, 56, 58 are used which indicate constant horizontal components of the displacements of the earth's surface 14.

It is expected that minimal horizontal displacement (indicated by line 54) will generally occur near the center 28 of the reservoir 12, greater horizontal displacement (indicated by line 56) will occur between the center and the periphery of the reservoir, and minimal horizontal displacement (indicated by line 58) will occur beyond the periphery of the reservoir. Thus, certain characteristics of the reservoir 12 (e.g., shape, center, location, periphery, presence, etc.) may be determined directly from the measured horizontal displacements. The horizontal displacements may be used in the virtual intelligence techniques described below to obtain more accurate determinations of characteristics of the reservoir 12, either alone or combined with other data, such as the vertical displacements discussed above.

Figure 5:
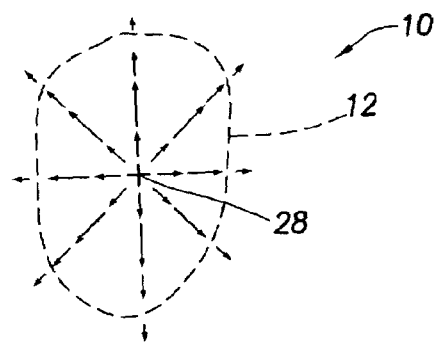
FIG. 5 is a schematic plan view of an angular component of displacements that may be detected in the method.

Yet another way to determine characteristics of the reservoir 12 is depicted in FIG. 5. Arrows shown in FIG. 5 indicate a direction and magnitude of the angular components of the deflections of the earth's surface 14 as detected by tiltmeters 24*a-e*. Note that the angular deflections are expected to decrease near the center 28 of the reservoir 12, and each of the angular deflections is in a direction away from the center of the reservoir. The angular deflections are expected to initially increase moving away from the center 28, and then decrease as the periphery of the reservoir 12 is approached. Beyond the periphery of the reservoir 12, the angular deflections are expected to gradually decrease to minimal values.

Thus, it will be appreciated that the angular deflections may be used to directly determine certain characteristics of the reservoir 12 (e.g., shape, center, location, periphery, presence, fluid mobility, etc.). In addition, the angular deflections may be used in the virtual intelligence techniques described below to obtain more accurate determinations of characteristics of the reservoir 12, either alone or combined with other data, such as the horizontal and vertical displacements discussed above.

In the foregoing description of the method 10, a relatively simplistic view of the reservoir 12 and its responses to various stimuli has been presented, so that the fundamental principles underlying the invention may be readily understood. However, it will be appreciated that actual circumstances in which these principles may be utilized in practical applications will most likely be far more complex. For example, one complexity could be the presence of multiple reservoirs. Such multiple reservoirs could be horizontally spaced apart, or they could partially or completely overlap. Another complexity could be the presence of multiple stimuli affecting pressure in one or more reservoirs.

Where multiple reservoirs overlap, the displacements at the earth's surface due to a stimulus (such as tidal loading) applied to all of the reservoirs may in some circumstances be a sum of the displacements due to each reservoir's response to the stimulus as predicted by corresponding reservoir models. A similar calculation of total surface displacement may be made in some circumstances where different stimuli (such as pressure changes) are applied to corresponding different overlapping reservoirs. A more accurate calculation may be made in some circumstances by weighting predicted displacements due to stimulus applied to more shallow reservoirs greater than the predicted displacements due to stimulus applied to deeper reservoirs.

Various other techniques may be used to deal with the complexities of multiple overlapping reservoirs. For example, multiple wells intersecting the multiple reservoirs could be used to evaluate the response of each individual reservoir to the stimulus. Multiple wells intersecting the same reservoir will give an improved picture of the response of that reservoir to the stimulus, for example, by injecting fluid into the reservoir via the multiple wells.

Another technique for dealing with such complex problems is to use virtual intelligence systems which learn and/or adapt to the problem presented, so that it is not necessary to initially, analytically determine each factor and its specific contribution to a solution to the problem. Instead, the virtual intelligence systems computationally arrive at a solution using algorithms selected for their suitability for learning and/or adapting the solution to the problem. Virtual intelligence systems may use genetic algorithms, neural networks, fuzzy logic, and/or a combination of these or other techniques.

Figure 6:
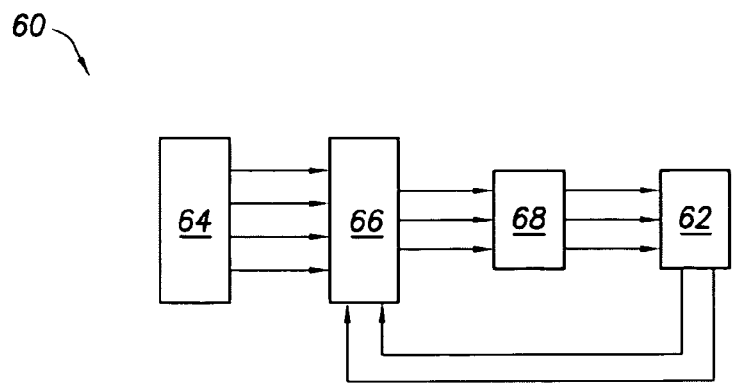
FIG. 6 is a schematic diagram of a reservoir characteristics optimization technique used in the method.

Representatively illustrated in FIG. 6 is a virtual intelligence system 60 which may be used in the method 10. It should be clearly understood that this is only one example of the wide variety of virtual intelligence systems which may be used in the method 10. Many other types of virtual intelligence systems may be used in place of, or in addition to, the system 60 in keeping with the principles of the invention.

The system 60 utilizes a genetic algorithm 62 for evolutionary optimization of a reservoir "chromosome" comprising a set of reservoir characteristics. In experimental tests, reservoir chromosomes have represented twelve reservoir characteristics using 120 bits as follows: center x coordinate (12 bits), center y coordinate (12 bits), center z coordinate (12 bits), incremental pore pressure (12 bits), semi-major axis (8 bits), semi-minor axis (8 bits), azimuth (8 bits), dip (8 bits), porosity (8 bits), S-wave velocity (12 bits), P-wave velocity (12 bits), and density (8 bits). Other reservoir characteristics (such as any of the reservoir characteristics described above) and combinations of reservoir characteristics may be used to construct reservoir chromosomes in keeping with the principles of the invention.

An initial population of reservoir chromosomes 64 is created. These chromosomes 64 will include values for the reservoir characteristics which are reasonable. For example, a negative depth or an unreasonable porosity value would not be used in the chromosomes 64.

A model 66 is used to calculate surface displacements and/or pressure changes, etc. in response to input of each of the chromosomes 64 to the model. The model 66 could, for example, be a prolate spheroid, penny-shaped, right cylinder or other type of reservoir model. The model 66 produces a set of output (for example, surface displacements, pressure changes, etc.) for each of the chromosomes 64.

Each set of output from the model 66 is then compared to the measured data (such as that measured by the tiltmeters 24a-e, pressure sensors, satellite 34 and/or other measurement devices) in a fitness evaluation 68. A fitness score is assigned to each reservoir chromosome 64 based on how closely the corresponding output of the model 66 matches the measured data. For example, the fitness evaluation 68 could include a least squares of error comparison between the output of the model 66 and the measured data.

The most "fit" of the reservoir chromosomes 64 (i.e., those having the best fitness scores) are selected for chromosome-based crossover and mutation using the genetic algorithm 62. This crossover and mutation produces a next generation of reservoir chromosomes 64, which are input to the model 66 as described above.

The process of generating the reservoir chromosomes 64, inputting the reservoir chromosomes to the model 66, and evaluating the output of the model using the fitness evaluation 68 is repeated for each successive generation of chromosomes until at least one of the reservoir chromosomes produces an acceptably high fitness score, or until a maximum generation number is reached.

As stated above, other types of virtual intelligence techniques (such as neural networks, fuzzy logic, etc.) may be used in place of the system 60. In addition, more complex problems (such as characterization of multi-layered reservoirs, characterization of multiple overlapping and/or spaced apart reservoirs, complex geophysical arrangements, etc.) may be evaluated using these virtual intelligence techniques.

The reservoir characteristics determined using the method 10 may indeed be used for many purposes. For example, to determine a drainage pattern of a reservoir, monitor and/or predict subsidence due to reservoir drainage, detect the presence of previously unknown reservoirs, the presence of previously unknown reservoir barriers, etc.

Figure 7:
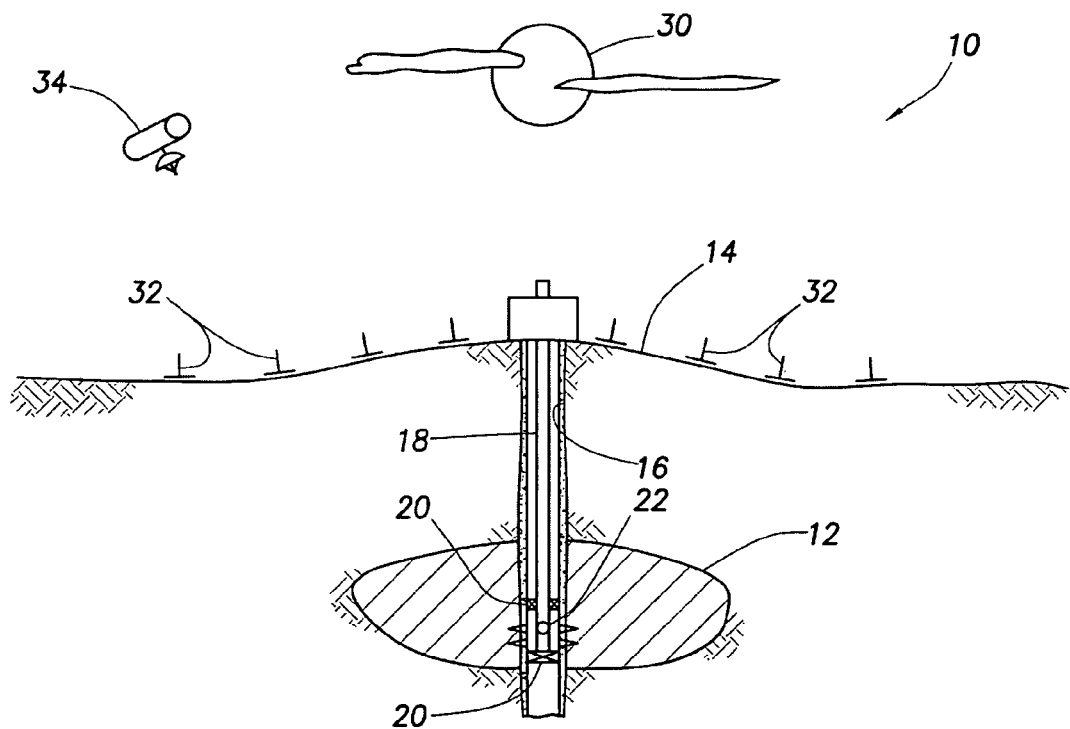
FIG. 7 is a schematic cross-sectional view of the reservoir, wherein the reservoir has an altered volume due to an earth tide.

In an alternative embodiment of the method 10 as depicted in FIG. 7, a pressure change in the reservoir 12 is detected as a response to a tidal loading stimulus. As used in this patent specification, tidal loading refers to loading due to gravitational force exerted by a heavenly body 30, such as the sun or moon, or a combination of gravitational forces exerted by multiple bodies. The consequence of such loading is an "earth tide."

As illustrated in FIG. 7, the body 30 exerts gravitational force on at least the crust of the earth, causing the "earth tide" (periodic displacement of the earth's crust due to gravitational force). In response to an increased tidal loading on the earth's crust, the reservoir 12 expands and the earth's surface 14 above the reservoir correspondingly displaces upward relative to the earth's surface remote from the reservoir. That is, the earth's surface 14 remote from the reservoir 12 may also displace upward in response to the tidal loading, but the earth's surface above the reservoir may displace upward to a greater extent due to the presence of a more vigorously expanding reservoir.

Displacement of the earth's surface 14 may be detected by an array of tiltmeters 32 similar to the tiltmeters 24a-e described above. Certain characteristics of the reservoir 12 may be determined using the displacements of the earth's surface 14 as detected by the tiltmeters 32, including but not limited to the presence, location, peripheral shape, geometric center, etc., as described above.

As the reservoir 12 expands and contracts in response to the tidal loading, pressure in the reservoir changes. Expansion of the reservoir 12 causes a reduction in pressure, while contraction of the reservoir causes an increase in pressure. These pressure changes may be detected in various ways.

As depicted in FIG. 7, the wellbore 16 extends through the reservoir 12 and is cased. Perforations permit communication between the reservoir 12 and the tubular string 18 via the port 22. In this manner, the tubular string 18 may be used to monitor pressure in the reservoir 12. Other techniques, such as using wireline-conveyed pressure sensors, sensors which communicate via wireless telemetry, temporary or permanently installed sensors, etc., may be used in keeping with the principles of the invention. Although only the single wellbore 16 is shown in FIG. 7, pressure changes in the reservoir 12 are preferably monitored via multiple wellbores drilled into the reservoir.

Since the tidal loading changes in a well known periodic manner and the resulting periodic change in the reservoir 12 pressure is detected in the method 10 as shown in FIG. 7, characteristics of the reservoir may be readily determined. For example, permeability may be determined once a critical frequency of the periodic pressure change in the reservoir 12 is known.

The time dependent flow equation for a closed reservoir under the influence of tidal loading is as follows:

$$T_c = (T/j)((P_{SD}/P_a(T)) - 1) \quad (1)$$

where j is a constant, $P_a(T)$ is the amplitude of the pressure change in the reservoir, $P_{SD}$ is the steady state pressure in the reservoir at its maximum volume, T is the period of the tidal loading, and $T_c$ is the critical period.

$P_a(T)$ may be determined from Fourier decomposition of recorded pressure changes in the reservoir 12 due to tidal loading. $P_{SD}$ may be determined from the magnitude at one of the gravitational cycles. Since the frequencies of the tidal loading components are known, discrete frequencies using a discrete Fourier transform is preferable to using the more common fast Fourier transform to determine the amplitudes and phases of the tidal loading induced reservoir pressure responses. T is well known from astronomical observations.

Thus, the critical period $T_c$ may be readily calculated. Note that, since multiple tidal loading periods exist, corresponding multiple calculations of the critical period $T_c$ may be made using equation (1).

Permeability may then be calculated as follows:

$$k = (\pi \mu a l c_f)/2T_c \quad (2)$$

where k is the gross permeability, $\pi$ is a constant, $\mu$ is the viscosity of the fluid in the reservoir, a is the wellbore radius, l is the length of the interval in the reservoir over which the pressure is detected, and $c_f$ is the fluid compressibility.

The wellbore radius a and interval l should be known. The viscosity $\mu$ and fluid compressibility $c_f$ may be determined using, for example, a wireline-conveyed formation tester or other fluid sampling device.

In a similar manner, characteristics such as vertical permeability, reservoir compressibility, porosity, etc. may also be determined.

Note that the expansion and/or contraction of the reservoir 12 in the method 10 as illustrated in FIG. 2 could be caused by tidal loading instead of, or in addition to, being caused by human intervention. Pressure in the reservoir 12 may be monitored and various characteristics of the reservoir may be determined in the FIG. 2 embodiment in a manner similar to that described above for the FIG. 7 embodiment of the method 10.

Similarly, expansion and/or contraction of the reservoir 12 in the FIG. 7 embodiment could be caused by human intervention instead of, or in addition to, being caused by tidal loading. Various characteristics of the reservoir 12 may be determined in the FIG. 7 embodiment similar to the manner described above for the FIG. 2 embodiment of the method 10.

Figure 8:
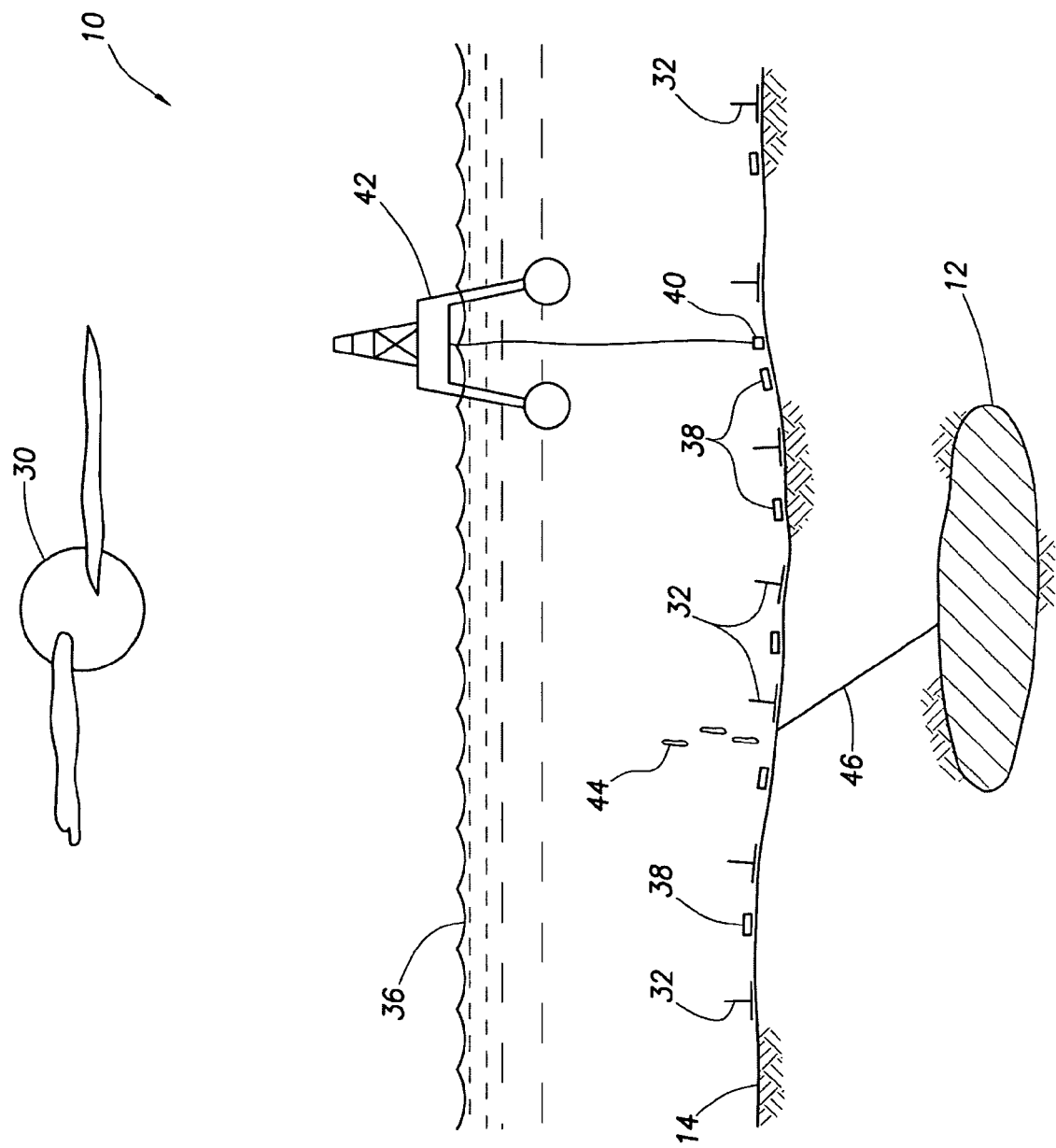
FIG. 8 is a schematic cross-sectional view of the reservoir, wherein the reservoir has an altered volume due to an ocean tide.

Referring additionally now to FIG. 8, another alternative embodiment of the method 10 is illustrated in which the earth's surface 14 is covered with water (i.e., the earth's solid surface is an ocean floor, seabed, etc.). In this embodiment of the method 10, ocean tidal loading operates as a stimulus in a more robust and different manner from that described above for the FIG. 7 embodiment.

Where a significant depth of water 36 covers the earth's surface, ocean tides have a substantially greater effect on the reservoir 12 than do earth tides. As the gravitational force exerted on the earth by the body 30 (or a combination of heavenly bodies) changes, hydrostatic pressure exerted by the water 36 covering the earth's surface 14 also changes due to the ocean tides. An increased hydrostatic pressure will cause a compression of the reservoir 12, and a decreased hydrostatic pressure will cause an expansion of the reservoir.

As depicted in FIG. 8, a body 30 is directly over the reservoir 12, and the gravitational force exerted by the body has caused a depth of the water 36 to increase. This increased water depth increases the hydrostatic pressure exerted on the earth's surface 14, thereby compressing the reservoir 12 and causing the earth's surface above the reservoir to displace downward somewhat.

This displacement of the earth's surface 14 may be detected by means of an array of tiltmeters 32. Alternatively, or in addition, motion of the earth's surface 14 may be detected by use of accelerometers 38, such as geophones. Any means of detecting displacement of the earth's surface 14 may be used in the embodiment of the method 10 shown in FIG. 8 in keeping with the principles of the invention.

Since the ocean tidal loading exerted on the reservoir 12 is periodic, characteristics of the reservoir may be determined by monitoring and evaluating the response of the reservoir to ocean tidal loading, similar to the manner described above for the embodiment of the method 10 depicted in FIG. 7 for earth tides. A wellbore, such as the wellbore 16 described above, should be drilled into the reservoir 12 to monitor pressure in the reservoir.

However, it should be clearly understood that it is not necessary in keeping with the principles of the invention for a wellbore to be drilled into a reservoir in order to determine certain characteristics of the reservoir, such as its geometric characteristics. For example, in the method 10 as depicted in FIG. 8, virtual intelligence techniques (sometimes also known as artificial or computational intelligence techniques) could be used to determine characteristics of the reservoir 12 based on data such as the periodic displacements of the earth's surface 14 as detected by the tiltmeters 32, without drilling into the reservoir.

To assist in the determination of characteristics of the reservoir 12 in the embodiment of the method 10 illustrated in FIG. 8, accurate measurements of the periodic tidal loading are used. To obtain these measurements, a sensor 40 could be deployed from a facility 42 proximate to the earth's surface 14 above the reservoir 12. For example, the sensor 40 could be a pressure sensor to measure the periodic hydrostatic pressure at the earth's surface 14, or the sensor could be a depth sensor to directly measure the periodic depth of the water 36, etc.

It may now be fully appreciated that the method 10 as depicted in FIG. 8 permits various characteristics of the reservoir 12 (such as location, presence, periphery, shape, volume, geometric center, etc.) to be determined, even though the earth's surface 14 may be covered with water 36. In addition, the location of fluid transfer in the reservoir 12 may be determined using the method 10. For example, fluid 44 (such as gas, oil, etc.) could leak from the reservoir 12 (e.g., via a fault 46). Such fluid transfer and its location may be determined by evaluating the displacements of the earth's surface 14 and other data, for example, using the virtual intelligence techniques described above.

Note that the method 10 as described above and illustrated in FIGS. 1-6 does not necessarily include tidal loading in the analysis of characteristics of the reservoir 12. Instead, the effects of tidal loading could be eliminated from the measurements used to determine the reservoir characteristics. For example, displacements and pressure changes due to tidal loading (perhaps measured prior to a test) could be subtracted from the total displacements and pressure changes detected, in order to compensate for the tidal effects.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic; wherein in the detecting step, the stimulus applied to the reservoir comprises periodic tidal loading, the tidal loading being due to at least one of gravitational force exerted on the earth by a heavenly body and hydrostatic pressure applied to a surface of the earth due to ocean tides.

2. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic is a total volume of the reservoir.

3. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic is a change in a volume of the reservoir over time.

4. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic comprises a presence of multiple resevoirs.

5. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic comprises a change in permeability of the reservoir.

6. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic comprises a change in porosity of the reservoir.

7. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic comprises a change in a location of fluid transfer in the reservoir.

8. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic comprises a change in compressibility.

9. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility, compressibility, and a thermal characteristic, wherein in the determining step, the reservoir characteristic comprises a change in viscosity of fluid in the reservoir.

10. A method of characterizing a subterranean reservoir, the method comprising the steps of: detecting a response of the reservoir to a stimulus, the stimulus causing a pressure change in the reservoir, and the detecting step further including measuring the response as a set of displacements of a surface of the earth; and determining a characteristic of the reservoir from the response to the stimulus, the reservoir characteristic comprising at least one of shape, location, presence, permeability, porosity, a location of fluid transfer, fluid viscosity, fluid mobility. compressibility, and a thermal characteristic, wherein in the determining step, the reservoir characteristic comprises a change in a thermal characteristic.

11. A method of characterizing a subterranean reservoir, the method comprising the steps of: detecting a set of displacements of a surface of the earth corresponding to a pressure change in the reservoir; and determining a characteristic of the reservoir from the surface displacements, the reservoir characteristic comprising at least one of reservoir volume, shape, location, presence, permeability, porosity, a location of fluid transfer, fluid viscosity, fluid mobility, compressibility, and a thermal characteristic, and the determining step further including implementing a virtual intelligence technique; wherein in the detecting step, the pressure change is due at least in part to periodic tidal loading.

12. A method of characterizing a subterranean reservoir, the method comprising the steps of: detecting a set of displacements of a surface of the earth corresponding to a pressure change in the reservoir; and determining a characteristic of the reservoir from the surface displacements, the reservoir characteristic comprising at least one of reservoir volume, shape, location, presence, permeability, porosity, a location of fluid transfer, fluid viscosity, fluid mobility, compressibility, and a thermal characteristic, and the determining step further including implementing a virtual intelligence technique, wherein in the inputting step, the virtual intelligence system is at least one of a genetic algorithm, neural network and a fuzzy logic system.

13. A method of characterizing a subterranean reservoir, the method comprising the steps of: detecting a set of displacements of a surface of the earth corresponding to a change in volume of the reservoir; and determining a characteristic of the reservoir from the surface displacements, the reservoir characteristic comprising at least one of reservoir shape, location, presence, permeability, porosity, a location of fluid transfer, fluid viscosity, fluid mobility, compressibility, and a thermal characteristic, wherein in the detecting step, the volume change is due at least in part to periodic tidal loading.

14. A method of characterizing a subterranean reservoir, the method comprising the steps of: detecting a set of displacements of a surface of the earth corresponding to a change in volume of the reservoir; and determining a characteristic of the reservoir from the surface displacements, the reservoir characteristic comprising at least one of reservoir shape, location, presence, permeability, porosity, a location of fluid transfer, fluid viscosity, fluid mobility, compressibility, and a thermal characteristic, wherein in the inputting step, the virtual intelligence system is at least one of a genetic algorithm, neural network and a fuzzy logic system.

15. A method of characterizing a subterranean reservoir, the method comprising the steps of: detecting a set of displacements of a surface of the earth corresponding to a change in volume of the reservoir; and determining a characteristic of the reservoir from the surface displacements, the reservoir characteristic comprising at least one of reservoir shape, location, presence, permeability, porosity, a location of fluid transfer, fluid viscosity, fluid mobility, compressibility, and a thermal characteristic, wherein in the determining step, the reservoir characteristic comprises a total volume of the resevoir.

* * * * *